(No Model.)
C. SMITH.
TROLLEY WHEEL.
No. 541,126. Patented June 18, 1895.
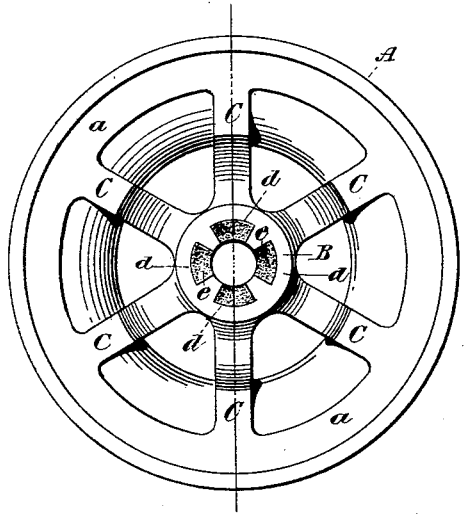
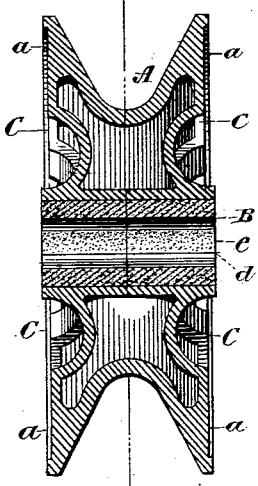
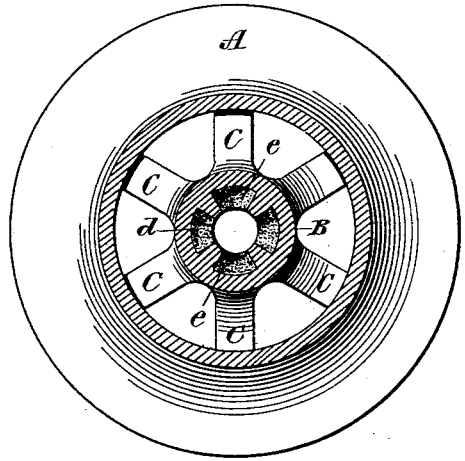
WITNESSES:
Gustave Dieterich
John Kehlenbeck
INVENTOR
Charles Smith,
BY
Chas. O. Gill
ATTORNEY.

UNITED STATES PATENT OFFICE.

CHARLES SMITH, OF BELLEVILLE, NEW JERSEY, ASSIGNOR TO THE EASTWOOD WIRE MANUFACTURING COMPANY, OF SAME PLACE.

TROLLEY-WHEEL.

SPECIFICATION forming part of Letters Patent No. 541,126, dated June 18, 1895.

Application filed March 30, 1894. Serial No. 505,716. (No model.)

*To all whom it may concern:*

Be it known that I, CHARLES SMITH, a citizen of the United States, and a resident of Belleville, in the county of Essex and State of New Jersey, have invented certain new and useful Improvements in Trolley-Wheels, of which the following is a specification.

The invention relates to improvements in trolley wheels, and consists in a wheel provided with the usual groove to receive the wire and being of a construction which permits of the interior of the wheel being hollow, the grooved rim or periphery of the wheel being united with the hub by means of spokes or arms extending outward from the opposite ends of the hub to the opposite edges of the periphery. The wheel will be of metal, preferably brass or other composition, and at its hub will contain a series of longitudinal dovetail grooves, provided with graphite or other suitable material which will be introduced into the grooves while in a soft state and allowed to harden therein.

The object of the invention is to produce a trolley wheel which will be light in weight and, when worn by its contact with the wire, will not become disintegrated or have its parts cut through so as to become entirely detached from one another, but which after that portion of the wheel constituting the walls of the groove shall have been worn through will maintain its integrity to a sufficient extent to permit the use of the worn wheel to the end of the route and thus avoid the necessity of changing the same except at the station or other point where such changes may be conveniently made.

Referring to the accompanying drawings, Figure 1 is a side elevation of a trolley-wheel constructed in accordance with and embodying the invention. Fig. 2 is a vertical section of same on the dotted line 2 2 of Fig. 1, and Fig. 3 is a vertical section of same on the dotted line 3 3 of Fig. 2.

In the drawings A designates the grooved periphery of the wheel; B, the hub, and C the spokes which pass from the outer ends of the hub to the opposite outer edges of the periphery of the wheel, the said parts A, B and C being cast integral with each other and forming a hollow wheel. The wheel is cast in the form of a shell, the periphery, spokes and hub constituting the outline thereof and being of suitable thickness for the purposes for which the wheel is intended. Along the opposite outer edges of the periphery of the wheel and forming a part of said periphery are the solid sides, lettered a, to which the outer ends of the spokes C join; and at the inner ends of the spokes the latter curve inward from opposite sides of the wheel, as indicated in Fig. 2, and unite with the outer opposite ends of the metal constituting the hub B, which is continuous from one side of the wheel to the other and integral with the radial spokes C at both sides of said wheel. The spokes C are separated from each other, leaving the inner surface of the grooved periphery of the wheel freely exposed to view, whereby any wear on said periphery sufficient to show at the inner surface thereof may be readily detected.

It may be observed on reference to Fig. 1 that the inner surface of the periphery A of the wheel is exposed between the outer or more widely separated ends of the radial spokes C.

The wheel constructed as above described may have the periphery A of any desirable thickness consistent with the proper weight and utility of the wheel, and it is the purpose of the invention to have said periphery of a thickness adapting it for use on the wires and having in mind the wear which comes upon the same from its contact with said wires.

One of the main objects accomplished by the invention is the providing of an efficient and desirable wheel in the use of which the edge or edges of the periphery thereof will not be cut off and wholly detached by the trolley wire, and this object has been effectually attained by means of the present invention, it being obvious that when the periphery of the wheel has cut through, the spokes C will retain the opposite edges of the periphery and cause the wheel to retain its shape and integral condition a sufficient length of time for the car to reach the depot or station at which it may be convenient to change the trolley wheel. If that portion of the metal constituting the periphery of the wheel should become cut entirely through, it is obvious that the wire may find a contact with the exterior of the continuous hub of the wheel or against the inner curved surfaces of the spokes C, and hence there is no danger of the car becoming disabled while on its route. The interior of of the wheel being hollow is an advantage, since thereby the wheel may be light in weight without detracting from its efficiency and the hollow or space between the spokes, periphery and hub may effectually receive the wire in case the periphery should become cut entirely through.

The inner surfaces of the hub B contain the longitudinal dove-tail grooves $d$ adapted to receive graphite, Babbitt metal, or equivalent material, as indicated at $e$, it being my purpose to introduce the graphite, metal or other material into the grooves $d$ while in a soft state and allow the same to harden therein. In the use of graphite for the grooves $d$, the said material will be placed into the grooves while in a soft condition and then baked therein, whereby the graphite will be rigidly secured in place and become a permanent part of the wheel. The grooves $d$ will be formed during the casting of the wheel and their surfaces will be allowed to remain in a rough state instead of being finished or smoothed, and the purpose of thus leaving the grooves $d$, is to secure a more rigid adherence of the graphite or other material to the walls thereof.

What I claim as my invention, and desire to secure by Letters Patent, is—

The trolley wheel hereinbefore described, consisting of the grooved rim having the solid sides $a$ along its peripheral edges, said rim extending below said solid sides and out of contact with the spokes of the wheel, the continuous hub, and the radial separated spokes extending from the opposite ends of said hub and merging into said solid sides and being curved inwardly at their inner ends and from said curved portions extended directly to said solid sides, leaving the inner surface of said rim free of and exposed to view between said spokes, substantially as and for the purposes described.

Signed at New York, in the county of New York and State of New York, this 28th day of March, A. D. 1894.

CHARLES SMITH.

Witnesses:
 CHAS. C. GILL,
 ED. D. MILLER.